Patented June 8, 1943

2,321,493

UNITED STATES PATENT OFFICE 2,321,493

PHENOL-FURFURYL ALCOHOL RESINOUS CONDENSATION PRODUCTS

Ernst Korten, Frankfort-on-the-Main-Fechenheim, Germany, assignor to General Aniline & Film Corporation, New York, N. Y., a corporation of Delaware No Drawing. Application August 13, 1940, Serial No. 352,406. In Germany August 17, 1939

3 Claims. (Cl. 260—47)

The present invention relates to resinous condensation products more particularly to those obtainable by condensing an aromatic compound containing at least one phenolic hydroxygroup with furfurylalcohol in the presence of a condensing agent which has an acid reaction during the process of condensation.

The reaction may be carried out in the presence or absence of a diluent, either in a single operation or in several steps.

As suitable reaction components there may be named for instance mono- and polyvalent phenols, hydroxybenzylalcohols or naphthols.

The present condensation products are resinous compounds corresponding mostly as to their physical and chemical behaviour with the phenol-formaldehyde condensation products. In the final state they yield, when usual fillers are added, mostly dark non-melting moulding articles of a remarkable mechanical stability and a bright surface, which are insoluble in all of the usual solvents.

They may be mixed with other natural or artificial resins, such as phenol-, urea-, aminotriazine-, aniline-, alkyd- or ketone resins.

The present new products are suitable for the manufacture of plastic and moulding powders, glueing agents, lakes, films and other artificial masses.

In order to further illustrate my invention the following examples are given, the parts being by weight and all temperatures in degrees centigrade.

Example 1

A mixture of 98 parts of furfurylalcohol, 47 parts of phenol, 200 parts of water and 10 parts of a dilute hydrochloric acid (density 1.018) is heated while stirring at about 75° for about 15 hours. Then the formed oily, when cold tough brown condensation product is isolated. It may be freed from some parts of soluble products of a low molecular weight by treatment with a dilute caustic soda solution and then washed until neutral in reaction. In some cases it is of an advantage, to further on purify the product before the addition of a filler by dissolving the raw product in alcohol and to isolate the resin when cold in order to remove ingredients of a lower degree of condensation. Then to the residue 55 parts of wood dust as filler are added and the mixture is slowly heated at about 100° while continuously kneading or milling the mass. Then the hard product of a light brown color thus obtained is finely pulverized. With the addition of a little amount of a hardening accelerator it may be pressed to a dark molded body of valuable properties.

Example 2

A mixture of 98 parts of furfurylalcohol, 31.5 parts of phenol, 200 parts of water and 10 parts of a dilute hydrochloric acid (density 1.018) is heated at about 75° for about 18 hours. After having removed the water the residue is washed out until neutral. Then to 100 parts of the residue 400 parts of water, 25 parts of ammonia of 25% strength and 100 parts of a formaldehyde solution of 30% strength are added and the mixture is heated at 50 to 60° for about 10 hours.

The condensation product thus formed is then washed out until a neutral reaction and worked up as described in the foregoing example while well kneading or milling.

The moulded bodies thus obtained are very similar to those as described in Example 1.

Example 3

A mixture of 98 parts of furfurylalcohol, 62 parts of a technical mixture of ortho- and para-hydroxybenzylalcohol, 100 parts of water and 10 parts of a dilute hydrochloric acid (density 1.018) is heated for about 6 hours at about 75°. The aqueous layer is separated and the residue is worked up as described in Example 1. The moulded body thus obtained is very similar to those of the foregoing examples.

Example 4

A mixture of 124 parts of a technical mixture of ortho- and para-hydroxybenzylalcohol, 100 parts of water, 98 parts of furfurylalcohol and 10 parts of a dilute hydrochloric acid (density 1.018) is heated for about 17 hours at about 75° and the reaction product is worked up as described in Example 1. When using cellulose as filler a moulded body of very similar properties as described above is obtained.

In the same manner a mixture of cresols, resorcinol or pyrogallol can be condensed with furfurylalcohol with the formation of dark resins.

Example 5

A mixture of 80 parts of 2.6-dihydroxynaphthalene, 98 parts of furfurylalcohol, 50 parts of water and 10 parts of a dilute hydrochloric acid (density 1.018) is condensed and worked up as described in Example 1. Moulded bodies of similar properties are obtained.

Instead of hydrochloric acid likewise other mineral acids or acid salts such as sodium bisulfate, moreover organic acids such as formic acid or neutral salts obtaining an acid reaction during the condensation process such as ammonium chloride may be used as catalyst.

I claim:

1. Resinous condensation products obtained by condensing only an aromatic compound containing at least one phenolic hydroxygroup with furfurylalcohol in the presence of a dilute solution of a condensing agent which has an acid reaction during the process of condensation.

2. Resinous condensation products obtained by condensing only phenol with furfurylalcohol in the presence of a dilute solution of a condensing agent which has an acid reaction during the process of condensation.

3. Resinous condensation products obtained by condensing only a technical mixture of ortho- and para-hydroxybenzylalcohol with furfurylalcohol in the presence of a dilute solution of a condensing agent which has an acid reaction during the process of condensation.

ERNST KORTEN.